(12) United States Patent
Bentley et al.

(10) Patent No.: US 6,237,994 B1
(45) Date of Patent: May 29, 2001

(54) MULTI-FUNCTION SEATS

(75) Inventors: Paul Bentley, Gainesville, TX (US); James Bridgeman, Kingston, OK (US); Cal Stringer, Saugus, CA (US); Lyn Arnold, Whitesboro, TX (US); John McCollum; Keith Porter, both of Gainesville, TX (US); Terry Ward, Lake Kiowa, TX (US); Karl Baird, Camarillo, CA (US)

(73) Assignee: Weber Aircraft, Inc., Gainesville, TX (US)

( * ) Notice: Subject to any disclaimer, the term of this patent is extended or adjusted under 35 U.S.C. 154(b) by 0 days.

(21) Appl. No.: 09/329,854

(22) Filed: Jun. 11, 1999

(51) Int. Cl.$^7$ .............................. A47C 13/00; B60N 2/32; A47B 83/02; A47B 3/14
(52) U.S. Cl. .......................... 297/118; 297/135; 297/144; 297/284.11; 297/362.11
(58) Field of Search .............................. 297/118, 284.11, 297/284.1, 144, 145, 135, 188.14, 188.15, 188.16, 188.17, 354.1, 361.1, 362.11, 300.1, 300.2

(56) References Cited

U.S. PATENT DOCUMENTS

| | | | |
|---|---|---|---|
| 423,698 | * | 3/1890 | Plimsoll ....................... 297/284.11 X |
| 1,178,749 | * | 4/1916 | Petrow .................................. 297/144 |
| 4,334,709 | * | 6/1982 | Akiyama et al. ................ 297/284.11 |
| 4,773,703 | * | 9/1988 | Krugener et al. ........... 297/284.11 X |
| 4,915,447 | * | 4/1990 | Shovar ............................ 297/284.11 |
| 4,944,552 | | 7/1990 | Harris . |
| 5,058,954 | * | 10/1991 | Kan-Chee .................... 297/284.11 X |
| 5,283,735 | * | 2/1994 | Bross et al. .................... 297/284.1 X |
| 5,370,444 | * | 12/1994 | Stulik ............................. 297/284.11 |
| 5,483,853 | * | 1/1996 | Moradell et al. ........... 297/362.11 X |
| 5,553,923 | | 9/1996 | Bilezikjian . |
| 5,560,681 | * | 10/1996 | Dixon et al. .................... 297/284.11 |
| 5,636,898 | | 6/1997 | Dixon et al. . |
| 5,647,635 | * | 7/1997 | Aumond et al. ................ 397/284.11 |
| 5,651,587 | | 7/1997 | Kodaverdian . |
| 5,712,625 | * | 1/1998 | Murphy ....................... 297/362.11 X |
| 5,882,070 | * | 3/1999 | Genn ................................ 297/135 X |
| 5,887,949 | | 3/1999 | Kodaverdian . |

* cited by examiner

Primary Examiner—Peter M. Cuomo
Assistant Examiner—Rodney B. White
(74) Attorney, Agent, or Firm—Dean W. Russell; Kirkpatrick Stockton LLP (57) ABSTRACT

Multi-function, adjustable seats and methods and systems for their manufacture and utilization are disclosed. Such seats are especially, although not exclusively, designed for use in commercial aircraft in response to consumer requests for enhanced comfort during long-haul flights. In addition to providing rocking motion, the seats have bottoms whose lengths are adjustable and provide stowable tables adapted not only to permit vertical adjustment, but also to tilt out of a horizontal plane and latch in an as-tilted position to function as a rest for a book, magazine, computer, or other object. Digital control technology, including a touch screen or similar device, may be employed to actuate features of the disclosed seats.

18 Claims, 11 Drawing Sheets

MULTI-FUNCTION SEATS

FIELD OF THE INVENTION

This invention relates to adjustable seats adapted to perform multiple functions and more particularly (although not exclusively) to aircraft passenger seats designed to enhance passenger comfort and facilitate aspects of their adjustment by passengers.

BACKGROUND OF THE INVENTION

Consideration of passenger comfort and convenience is a significant component of seat design. As the numbers of long- or extended-range aircraft (and other vehicles) grow in commercial fleets, passengers increasingly expend substantial amounts of time positioned in such seats. Passengers amenable to providing monetary value in exchange for enhanced comfort during long-range travel additionally have increased, as has availability of "frequent flyer" awards in which enhanced comfort is an advertised or corresponding benefit. Airlines and other commercial transportation companies thus continue to attempt to discern methods of improving the comfort and convenience of passengers as part of their overall operations.

U.S. Pat. No. 5,553,923 to Bilezikjian describes certain features of existing seats used typically in upper-class cabins. As noted at column 1, lines 25–30 of the Bilezikjian patent:

Business class and first class seats may be provided with a console with personal storage compartments, compartments for cocktail trays, and the like. A first class sleeper seat may include additional features such as a video monitor, an extendable leg rest, and other features for passenger comfort and convenience.

One such other feature provided in some reclinable seats is an elevatable seat bottom linked to each corresponding back. U.S. Pat. No. 5,636,898 to Dixon, et al. discloses a specific linkage assembly for interconnecting the bottom and back of such a seat so as purportedly to provide a ratio of seat back movement to seat bottom movement of greater than 1:1. According to the Dixon, et al. patent, the complex linkage assembly includes not only two pivot members, but also a "hip-joint pivot connection" and a link bar connected to both the seat frame and at least one pivot member. With the linkage assembly, the associated seat is designed so that it provides greater comfort to the occupant and prevents or minimizes dishevelment of clothing during travel caused by shirttails being pulled from trousers or skirts as the seat back pivots.

See Dixon, et al., col. 1, ll. 16–19.

Another feature incorporated into numerous commercial aircraft seats is a table stowable in an armrest of the seats. U.S. Pat. No. 4,944,552 to Harris details an exemplary table of this type, which in use is adapted to move angularly in a horizontal plane should, for example, a passenger need to depart his or her seat temporarily while the table is deployed. The Harris patent does not, however, expressly address any tilting or adjustment of the height of the table vertically while in use.

SUMMARY OF THE INVENTION

The present invention provides multi-function, adjustable seats and methods and systems for their manufacture and utilization. In addition to providing "rocking" motion with an assembly less complex than that of the Dixon, et al. patent, seats of the present invention may enhance passenger comfort by having bottoms whose lengths are adjustable, allowing passengers to match the effective lengths of their seat bottoms more closely with the lengths of their upper legs. Tables stowable in the seats additionally are adjustable vertically, moving food or other substances or materials closer to mouths and further from legs of seat occupants (or vice-versa) as desired, and may be tilted out of a horizontal plane and latched to function as, for example, a book, magazine, or computer rest. Each of these aspects of the seats and systems of the invention is intended to improve comfort-related performance of seats used commercially for transportation, whether in aircraft, land-based vehicles, or otherwise.

Additional features of seats of the present invention may include independently (or cooperatively) adjustable headrests, legrests, backrests, and lumbar supports. Adjustment of these components may occur manually, electrically, or otherwise as appropriate or desired. Moreover, if any portions of the adjustments are to be actuated electrically, a touch-screen or similar graphical user interface or digital electronic display may be employed in place of tactile analog or digital switches conventionally utilized for analogous operations.

In some embodiments of seats of the present invention, the touch-screen may be a control panel in the form of a liquid crystal display (LCD) or similar device. Such device may be programmed to provide protocol for passenger interaction with the seat control actuators and scroll-down or multi-screen menus of options for managing adjustment of the seat. The device as well may support at least temporary storage of personalized settings for various adjustments, allowing a passenger to return the seat to a specific position upon command.

Individual digital control panels consistent with the invention additionally may be linked electronically to either or both of the passenger entertainment system and cabin communication system of an aircraft or other vehicle. Doing so would allow requests for attendants to be made merely by activating an appropriate portion of the control panel; reading lights and individualized air conditioning systems could be controlled by touch screen too. These control panels thus could substitute not only for the dedicated entertainment monitors currently prevalent in long-range aircraft, but also for the myriad buttons, switches, and manual valves in use today. They could as well be programmed to provide diagnostic information should any portion of a seat not perform as expected. Static or dynamic advertising, duty-free shopping, credit card purchases, or other information or interaction further could be furnished through the touch-screen technology, which additionally could operate as part of any telephone or similar apparatus intended to provide communication between passengers and remote locales.

It is therefore an object of the present invention to provide multi-function seats for commercial aircraft and other use.

It is also an object of the present invention to provide adjustable seats and methods and systems for their manufacture and utilization.

It is a further object of the present invention to provide seats having bottoms whose lengths are adjustable, enhancing passenger comfort by allowing effective lengths of seat bottoms more closely to match lengths of upper legs of passengers.

It is another object of the present invention to provide stowable tables which both are adjustable vertically and may be tilted out of a horizontal plane in use.

It is an additional object of the present invention to provide electronic actuation of various features of seats, such actuation possible using, for example, digital, programmable touch-screen technology.

It is yet another object of the present invention to provide seats capable of motion similar to rocking, at least in that their seat bottoms may be elevated when corresponding seat backs recline, using less-complex mechanisms than heretofore employed.

Other objects, features, and advantages of the present invention will become apparent to those skilled in the art with reference to the remainder of the text and the drawings of this application.

DETAILED DESCRIPTION

Figure 1:
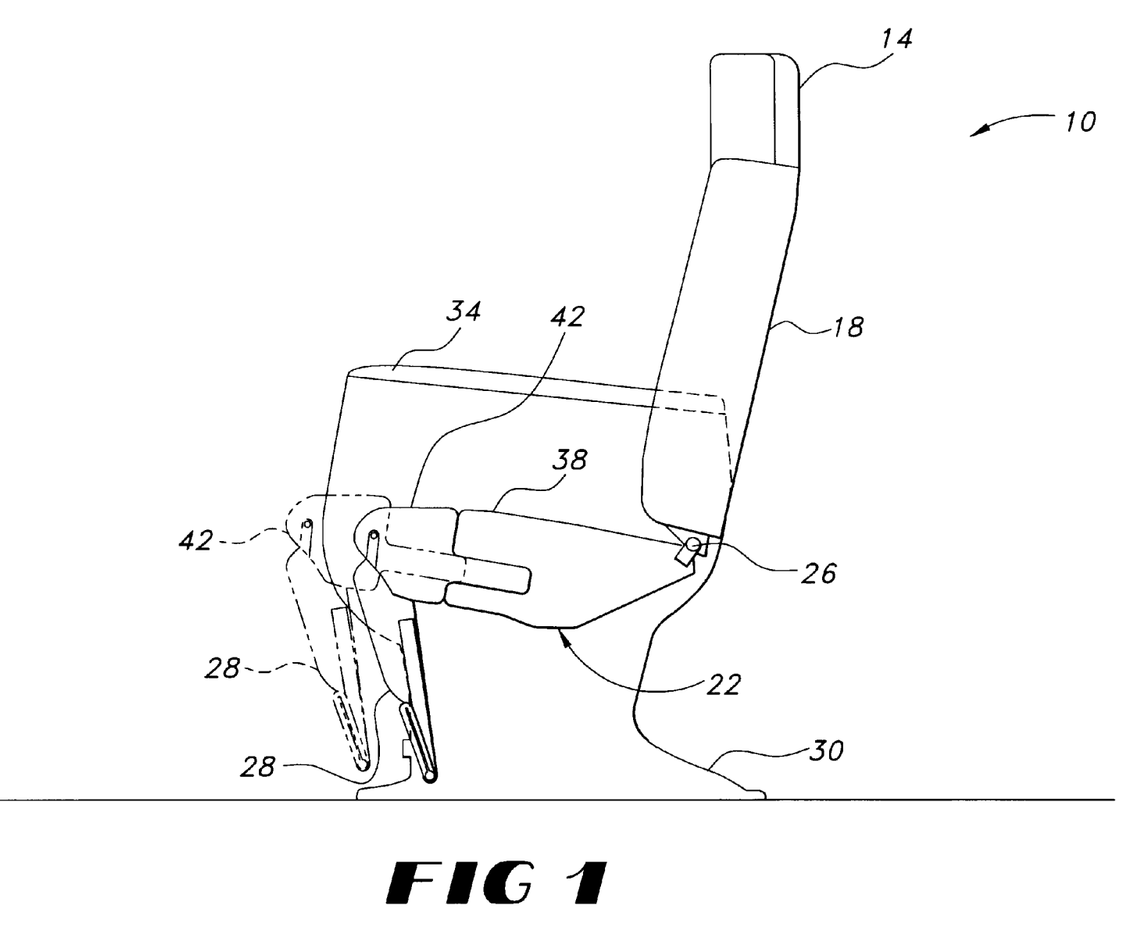
FIG. 1 is a side elevational, substantially-schematicized view of an exemplary seat consistent with the present invention.

FIG. 1 illustrates aspects of a seat 10 of the present invention. As shown in FIG. 1, seat 10 may include headrest 14, back 18, and bottom 22, the latter two of which may be connected by any suitable mechanism 26. Additionally detailed are legrest 28 and exterior portions of frame 30 of seat 10, which may be used to secure seat 10 to the floor of an aircraft or other vehicle or object. Also either included as part of frame 30 or connected thereto may be armrest 34, with a similar (although not necessarily identical) such armrest 34 being deployed on the side of seat 10 opposite that shown in FIG. 1. Those skilled in the art will, of course, recognize that seats and seating systems of the prevent invention need not be configured exactly as shown in FIG. 1 but rather may have fewer or greater components or appear other than as illustrated therein.

Figure 2:
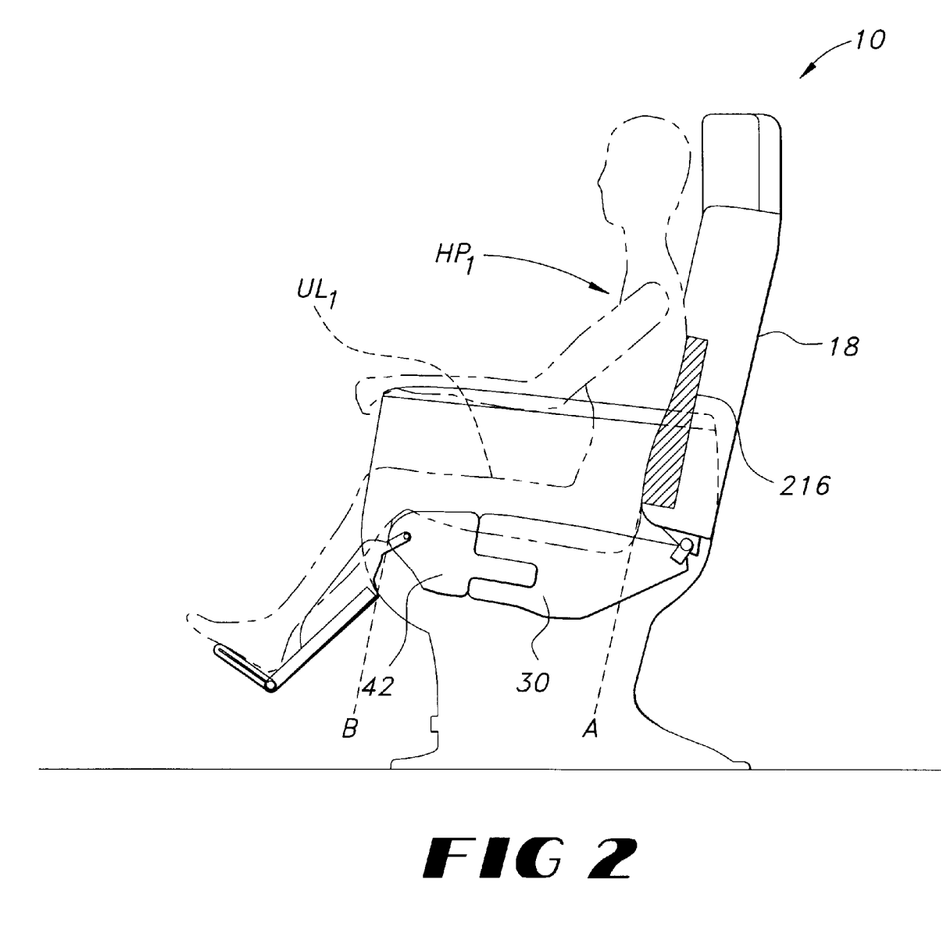
FIG. 2 is a side elevational, substantially-schematicized view of the exemplary seat of FIG. 1 shown with the seat bottom in an unextended position.
Figure 3:
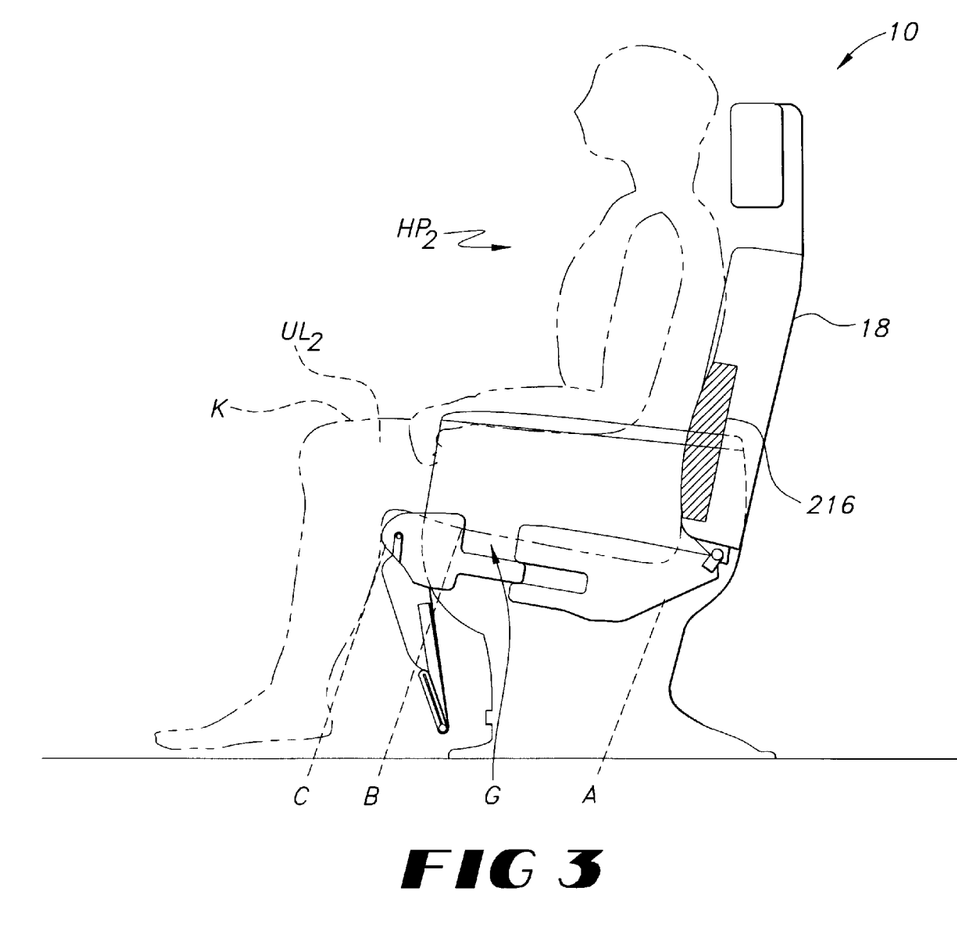
FIG. 3 is a side elevational, substantially-schematicized view of the exemplary seat of FIG. 1 shown with the seat bottom in an extended position.
Figure 4:
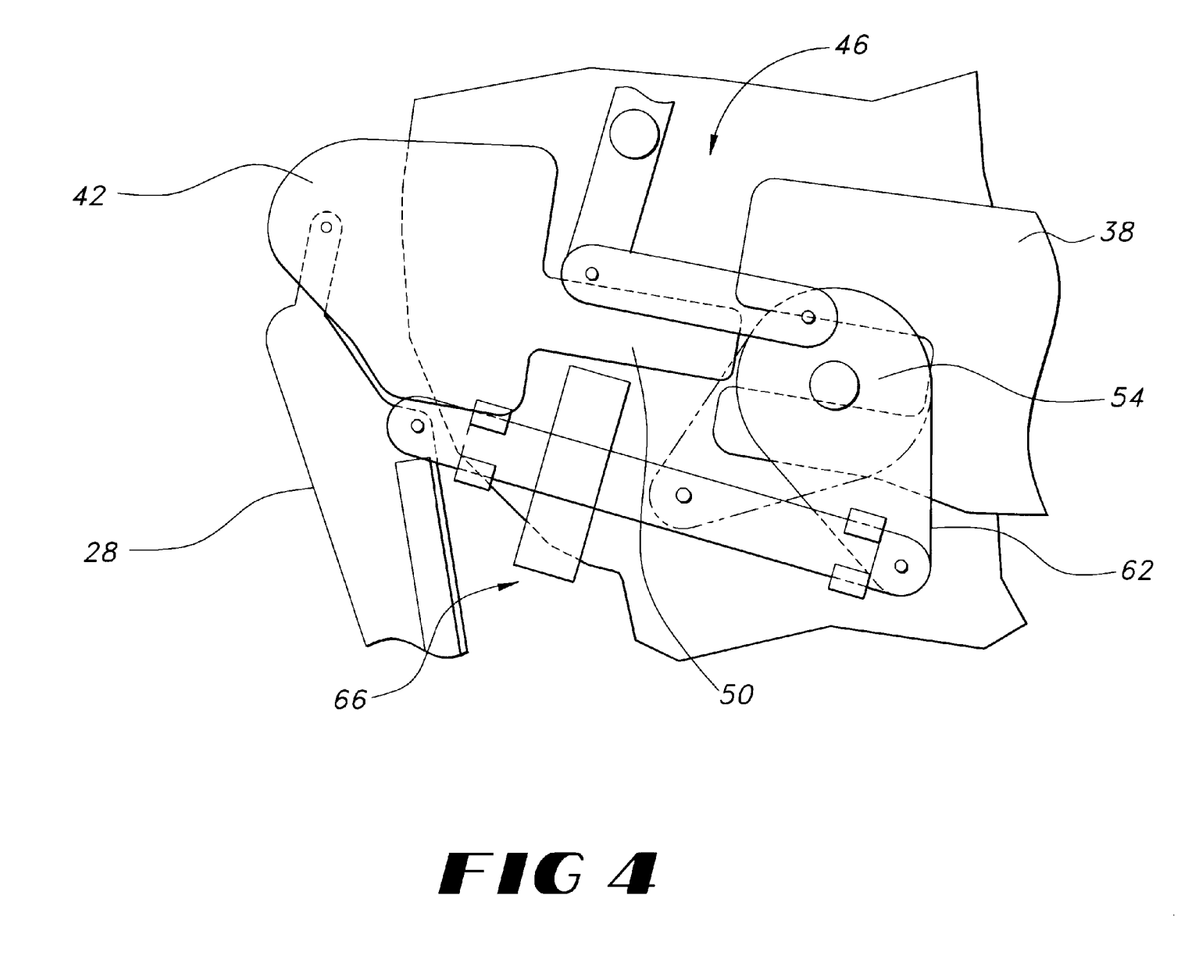
FIG. 4 is a diagrammatic view of an extension mechanism for the seat bottom of the seat of FIG. 1.

Nevertheless, FIG. 1, together with FIGS. 2–4, detail certain features of bottom 22 of seat 10. Included as part of bottom 22 are portions 38 and 42, the former denominated "fixed" portion 38 for purposes of this explanation (although it too may be moveable relative to frame 30) and the latter referred to as "extendable" portion 42. FIG. 1 details extendable portion 42 in both its unextended and extended positions, showing that in at least one embodiment of seat 10 an extension of approximately four inches is preferred.

Illustrated in FIG. 2 is extendable portion 42 of bottom 22 when in its unextended position. In such position extendable portion 42 typically abuts fixed portion 38, so that bottom 22 forms a continuous support for the distance defined by points A and B. As both portions 38 and 42 of bottom 22 usually are cushioned, they can provide a comfortable surface for a human passenger $HP_1$ seated thereon. If the length of the upper leg $UL_1$ of passenger $HP_1$ approximates the distance defined by points A and B (as is illustrated in FIG. 2), substantially that entire length will be directly supported by bottom 22 with portion 42 in the unextended position.

By contrast, shown in FIG. 3 is a human passenger $HP_2$, the length of whose upper leg $UL_2$ is significantly greater than the distance defined by points A and B. Absent extension of portion 42, therefore, seat bottom 22 cannot readily support the portion of upper leg $UL_2$ of passenger $HP_2$ adjacent and underneath his or her knee K. This result is contrary to preferences of passengers dimensioned like passenger $HP_2$, as failure of conventional seat bottoms to support the entire lengths of their upper legs $UL_2$—and particularly areas adjacent knees K—can diminish their feelings of well being, particularly during long-haul travel.

Accordingly, extendable portion 42 of bottom 22 is adapted to extend, manually or otherwise, upon demand of the occupant of seat 10. Such extension is shown in FIG. 3, with the effective length of bottom 22 no longer being the distance between points A and B, but instead defined by the (greater) distance between points A and C. This greater distance more closely approximates the length of upper leg $UL_2$ of passenger $HP_2$ than does the lesser distance between points A and B, thus providing support for areas of upper leg $UL_2$ adjacent knees K. Although in some embodiments of seat 10 extension of portion 42 may create a gap G between it and fixed portion 38 of bottom 22, such gap G is positioned so as minimally to interfere with the supporting function of the bottom 22.

Extension of portion 42 may occur using any suitable mechanism. FIG. 4 details one such extension mechanism 46 connecting portions 38 and 42, with one or more shafts 50 of extendable portion 42 insertable into corresponding recesses 54 in fixed portion 38. Included as part of mechanism 46 may be bars 58 attached directly or indirectly to portions 38 and 42 and to cams or other devices 62 connected to fixed portion 38 of bottom 22. Pulling outward on extendable portion 42 imparts rotation to devices 62, allowing movement of bars 58. Clutches or couplings 66 additionally may be included as part of mechanism 46, particularly should extension of portion 42 intermediate points B and C be desired.

FIGS. 5–8 show features of seat 10 relating to table assembly 70 thereof. Consistent with the disclosure of the Harris patent, for example, such table assembly 70 often may be stowed in a compartment 74 within an armrest 34 of seat 10. In some vehicles table assembly 70 may be connected to the reverse of seat back 18, however, or elsewhere as necessary or desired. Although such alternate connections for table assembly 70 are not preferred for the present invention, they nonetheless are contemplated hereby and would not necessarily preclude deployment of many of the innovative features described herein.

Figure 5:
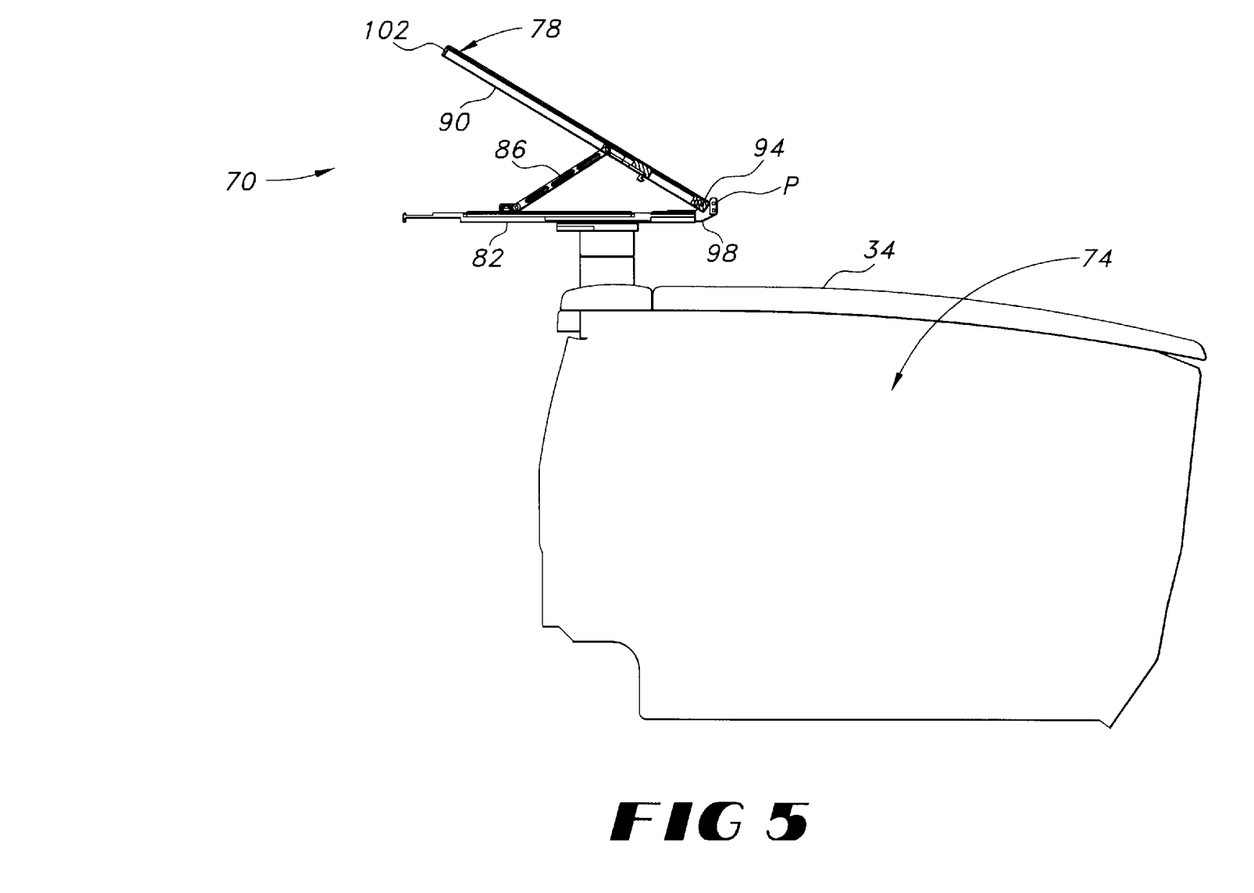
FIG. 5 is a side elevational, substantially-schematicized view of the exemplary seat of FIG. 1 shown with a table in a tilted position.

A principal conventional use of equipment like table assembly 70 is as a horizontal platform on which food, beverage, and other objects and substances may be placed. Table assembly 70 is adapted to function as such a platform and, when necessary, to be stowed in compartment 74. It thus may pivot in some or all of the manners described in the Harris patent for positioning as a horizontal platform.

Unlike many existing tables, however, table assembly 70 comprises not merely a single platform, but rather an upper section 78 and a base 82. When table assembly 70 functions as a platform, upper section 78 may rest atop base 82, with both components being horizontal. Although upper section 78 and base 82 need not be identically sized, base 82 typically should be configured so as (and have dimensions adequate) to support upper section 78 in use.

Shown in FIG. 5 as part of table assembly 70 is arm 86. Such arm 86 may connect base 82 to underside 90 of upper section 78, fitting into an appropriately shaped channel in underside 90 when both upper section 78 and base 82 are horizontal. Upper section 78 and base 82 additionally may be connected so as to allow upper section 78 to pivot about one or more points P at their respective first ends 94 and 98.

Grasping second end 102 of upper section 78 and pulling the upper section 78 toward the occupant of seat 10 hence would cause it to pivot about points P, effectively rotating upper section 78 to a position other than horizontal. If arm 86 is allowed to move along either underside 90 or base 82 and latch at various locations, upper section 78 can be tilted away from the horizontal as desired and induced to remain in place. Upper section 78 of table assembly 70 may thus function not just as the horizontal platform of conventional tables, but also as a non-horizontal rest for books, magazines, computers, or other objects.

Figure 6:
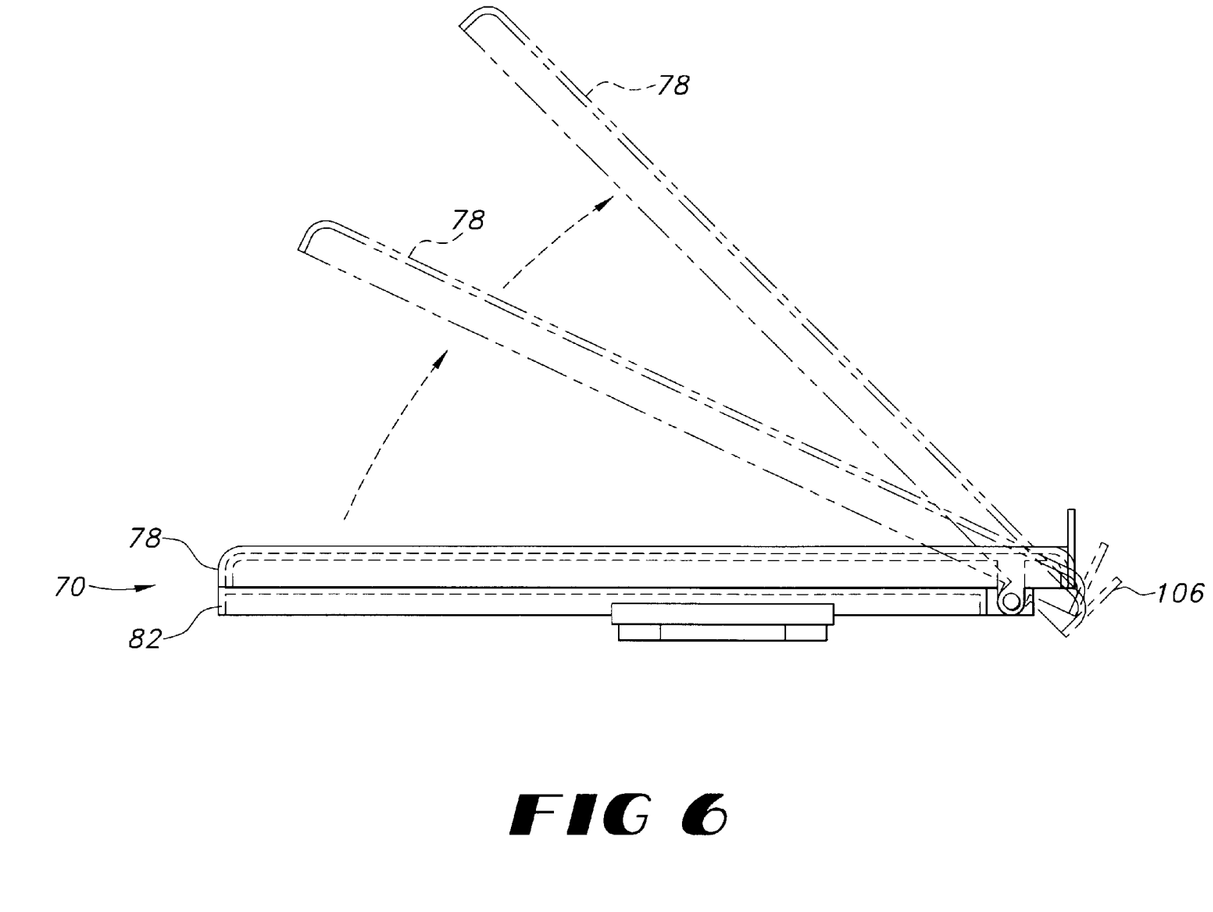
FIG. 6 is a diagrammatic view of an alternate mechanism for providing tilting of the table of FIG. 5.

FIG. 6 generically illustrates a rachet assembly 104 which may be used as part of table assembly 70 either instead of or in addition to arm 86. Those skilled in the art will recognize that numerous mechanisms suitable for tilting upper section 78 and latching it in a desired position exist and that any may be utilized consistent with the present invention. FIG. 6 additionally depicts ledge 106 which may be formed at first end 94 of upper section 78 to help support an object placed thereon when upper section 78 is tilted.

Yet another feature associated with table assembly 70 is its adjustability vertically, unlike tables currently deployed in aircraft and other vehicles. Such adjustability is portrayed generally in FIG. 7, with table assembly 70 illustrated in each of two limiting positions $P_1$ and $P_2$. Position $P_1$ of table assembly 70 is typical for conventional tables, with the plane of upper surface 78 being more or less coincident with (or slightly above) that of armrest 34. This position $P_1$ is acceptable for many uses of a table when the corresponding seat is upright, as discernable distance usually exists vertically between the knees K of a passenger and the underside of the table.

Figure 7:
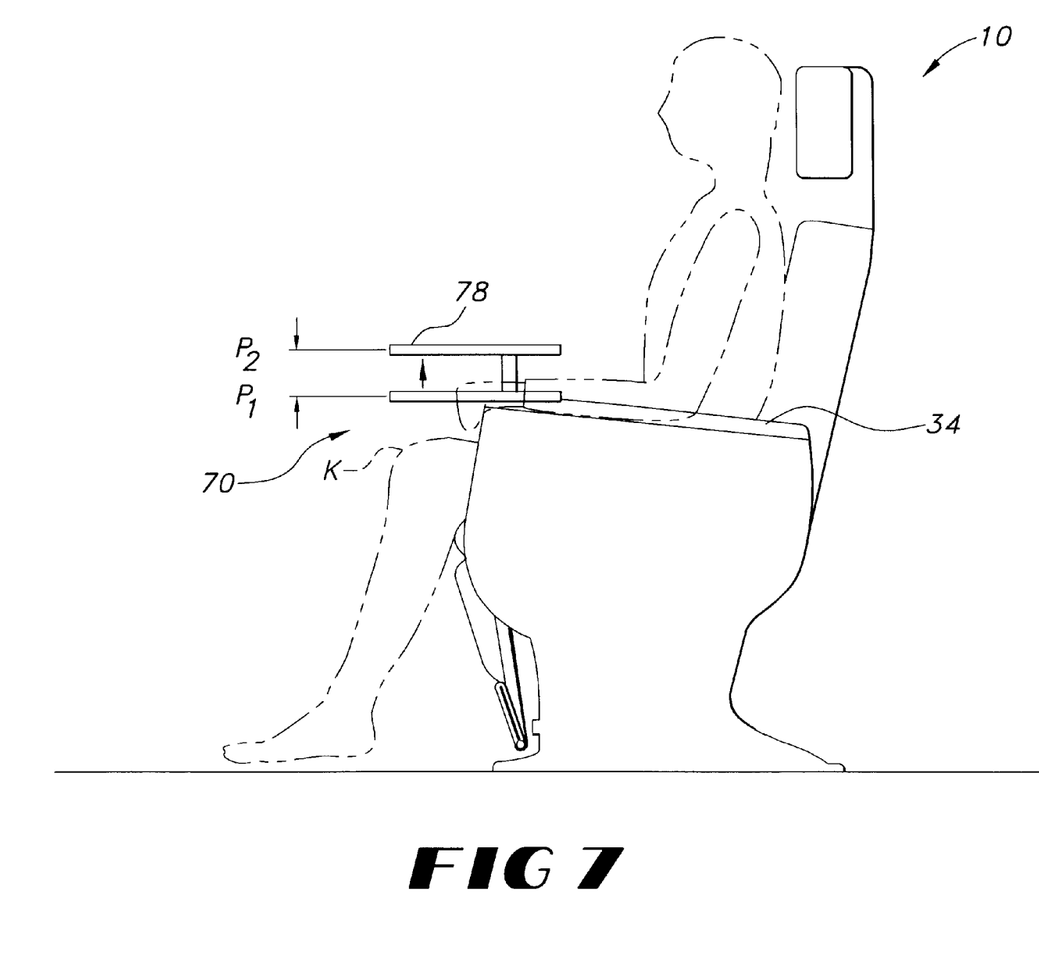
FIG. 7 is a side elevational, substantially-schematicized view of the exemplary seat of FIG. 1 showing vertical adjustment of the table of FIG. 5.
Figure 8:
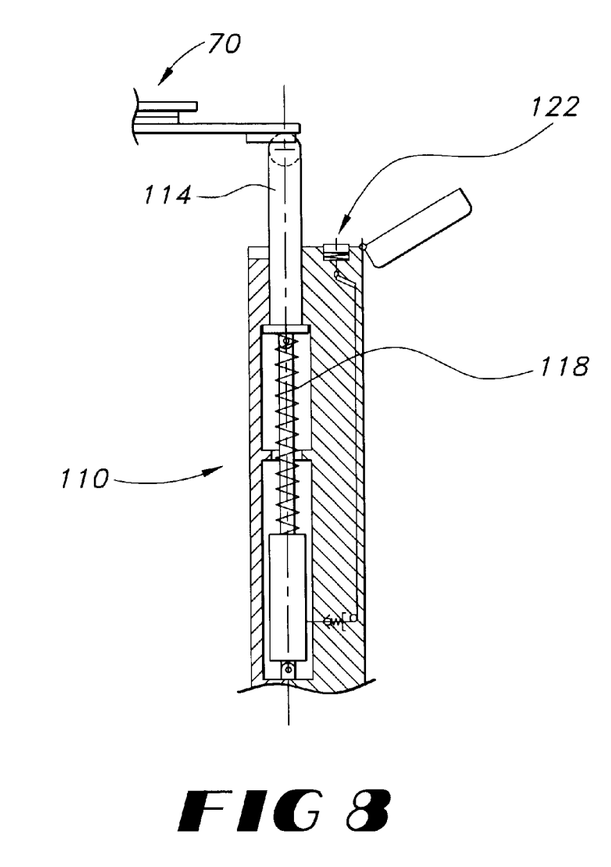
FIG. 8 is an elevational, substantially-schematicized view of an exemplary mechanism for providing the vertical adjustment of the table of FIG. 5.

Position $P_1$ is, however, often unsatisfactory when the corresponding seat is reclined, as the act of reclining the seat reduces to an unacceptable level the distance between the table and the passenger's knees K (or upper legs). Table assembly 70 is thus designed to adjust upward (as far as position $P_2$) to increase this distance as the occupant of seat 10 desires. Upward vertical adjustment additionally decreases the distance between upper surface 78 and the head or mouth of the passenger (especially when seat 10 is upright), which may be advantageous or desirable in certain instances.

In some embodiments of seat 10, the distance between positions $P_1$ and $P_2$ is approximately three inches. Table assembly 70 may be adjustable more or less than this amount, however, without being inconsistent with the scope of the invention. It too may be adjustable to points intermediate positions $P_1$ and $P_2$ if necessary or desired.

As with tilting of upper section 78, any of multiple methods and mechanisms may be utilized to permit adjustment of table assembly 70 vertically. FIG. 8 illustrates, again generically, one acceptable mechanism 110 embedded within compartment 74. Shaft 114, by which table assembly 70 is attached to mechanism 110, may utilize expansion of a spring 118 to cause table assembly 70 to adjust upward above position $P_1$. A button 122 or other device may be used to actuate mechanism 110 as, for example, by releasing compression of spring 118. Pushing downward on table assembly 70 could recompress spring 118 as, perhaps, could the act of stowing table assembly 70 within compartment 74.

Figure 9:
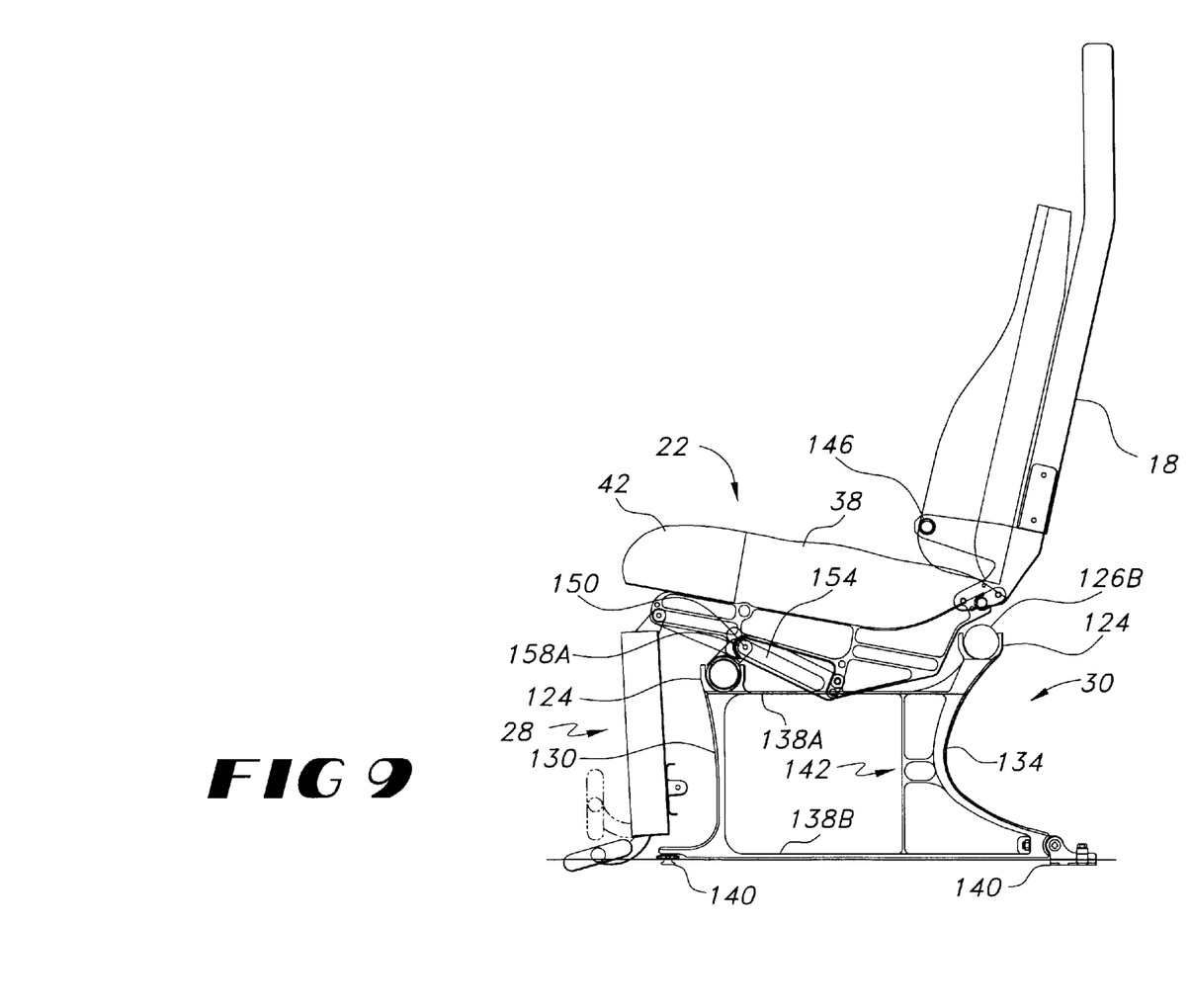
FIG. 9 is a side elevational, substantially-schematicized view of the exemplary seat of FIG. 1 showing aspects of its frame when in a generally upright position.
Figure 10:
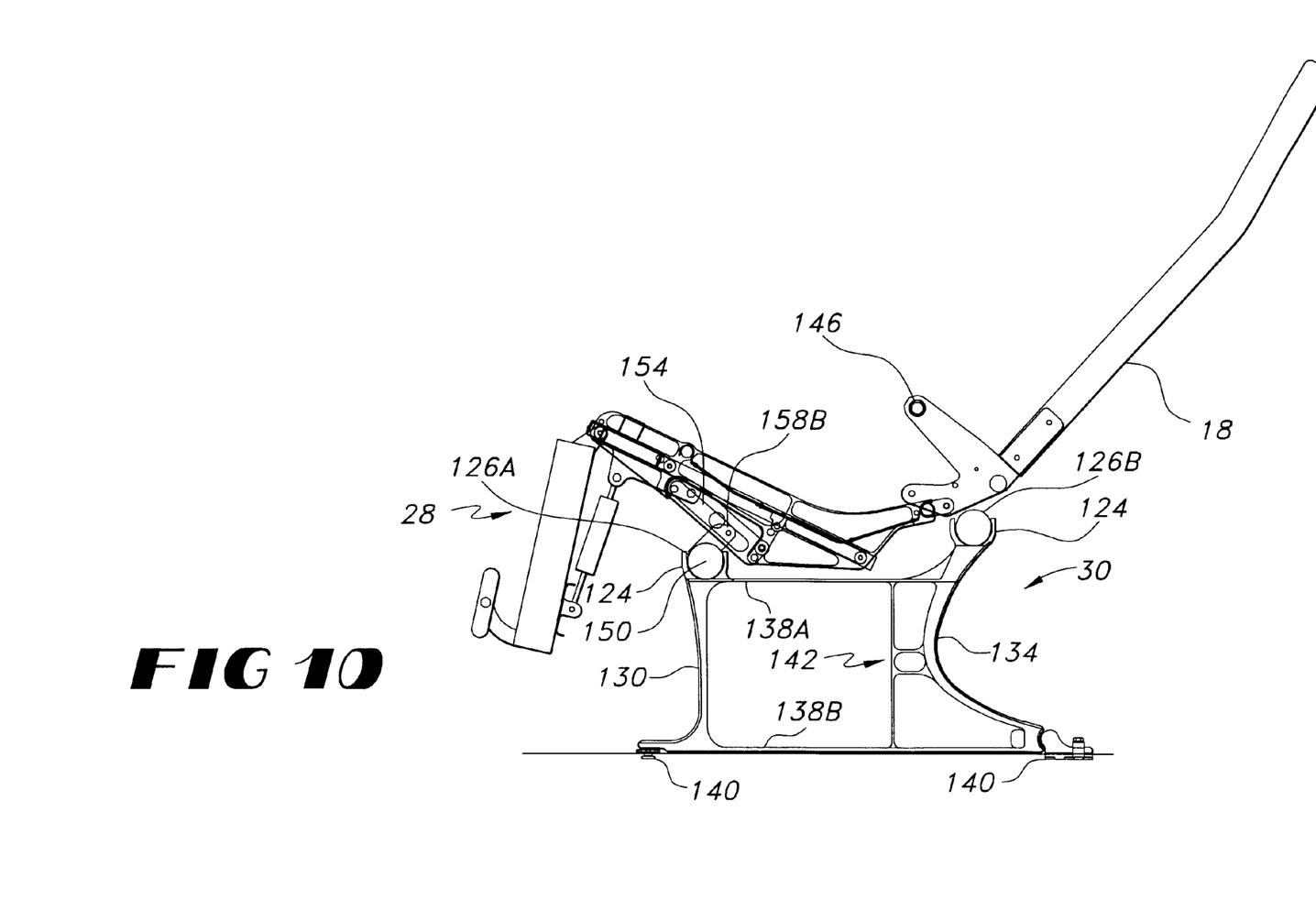
FIG. 10 is a side elevational, substantially-schematicized view of the exemplary seat of FIG. 1 showing aspects of its frame when reclined.

FIGS. 9–10 detail various internal portions of frame 30 of seat 10. Frame 30 may include many components described in the Bilezikjian patent, including stirrups 124 into which stretcher tubes 126A and 126B may be fitted. Front and rear legs 130 and 134, respectively, of frame 30 may be connected by horizontal struts 138A and 138B and secured to the floor of a fuselage, vehicle, or other object either directly or, preferably, indirectly using track fittings 140. Strut assembly 142, having both horizontal and vertical components, may be interposed between struts 138A and 138B for reinforcement of frame 30.

Shown as well in FIGS. 9–10 is a fixed point 146 of a lateral axis about which back 18 and bottom 22 pivot when back 18 is reclined. Point 146 is intended to be adjacent or in the vicinity of the hip of the occupant of seat 10. It therefore approximates the point and axis about which the occupant's legs move relative to his or her torso, improving ergonometric performance of seat 10. Stated differently, ease and effectiveness of recline of seat 10 is achieved by having designed the seat 10 with reference to the centers of gravity of typical passengers to be seated therein.

During pivoting of back 18 and bottom 22, roller 150, whose position likewise is fixed relative to the remainder of frame 30, is received in various locations within elongated slot or channel 154. In FIG. 9, for example, roller 150 is positioned at end 158A of channel 154 when back 18 is upright and bottom 22 in its most-horizontal state. In FIG. 10, by contrast, channel 154 has moved so that roller 150 is positioned at opposite end 158B of the channel 154 when back 18 is fully reclined. Utilizing the fixed roller 150 and fixed pivot points 146 provides a less-complex alternative to the linkage assembly of the Dixon, et al. patent, omitting many of the components thereof.

Figure 11:
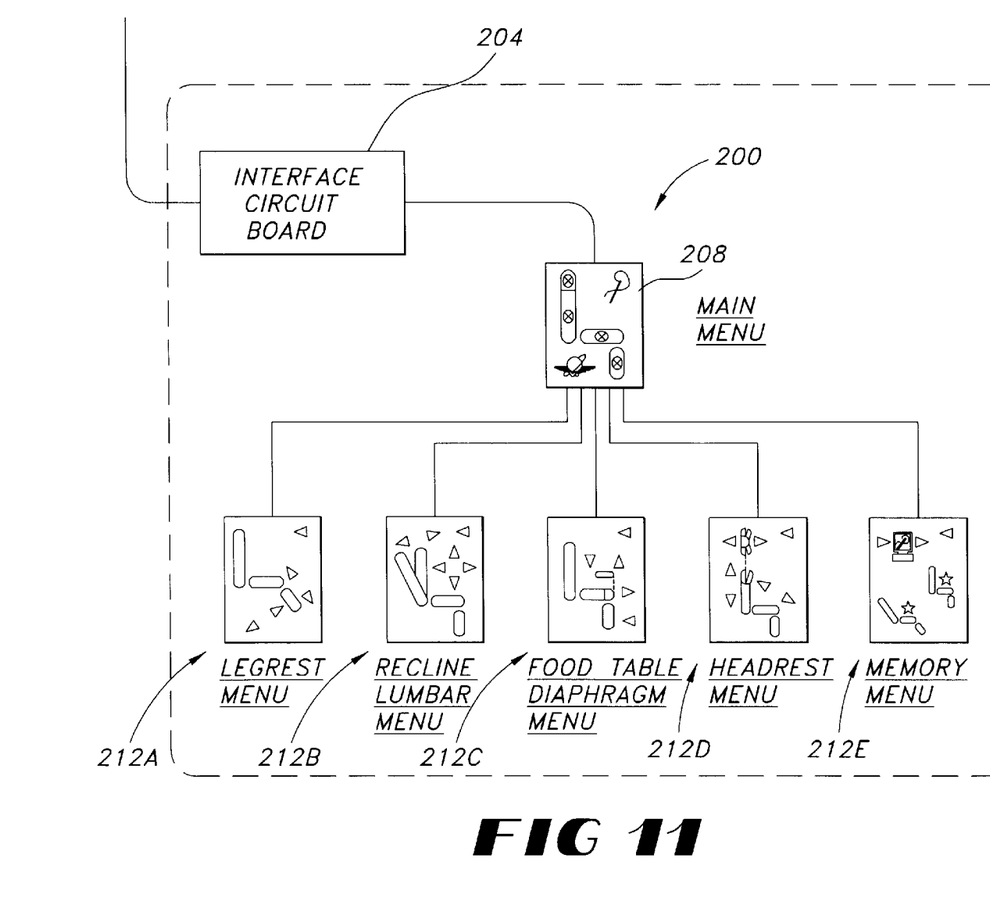
FIG. 11 is a diagrammatic view of an exemplary sequence and options presented by menus of an electronic, touch screen controller associated with the seat of FIG. 1.

FIG. 11, lastly, depicts icons 200 or other pictorial aspects of menus viewable on a pre-programmed (or programmable) LCD touch-screen or other device. The device, through appropriate interface circuitry 204, may connect to motors or other equipment useful for adjusting aspects of seat 10. It additionally may be programmed to display a main menu 208, which in FIG. 11 illustrates portions of seat 10 to which adjustments may be made. Depending on the passenger's response to the display of main menu 208, any of secondary menus 212A–E may be displayed.

For example, should a passenger desire to adjust legrest 28, he or she can contact the touch-screen device in the area of main menu 208 depicting legrest 28. Doing so causes menu 212A to appear, with (in the version of FIG. 11) triangular controls presenting the options available for adjusting the legrest 28. A separate triangular control in the upper right-hand corner of menu 212A permits return to main menu 208.

Likewise, appropriate responses of a passenger to the display of main menu 208 can cause menu 212B to appear and permit control of adjustments to back 18, including lumber support 216 of FIGS. 2–3. Secondary menu 212C permits control of the height of table assembly 70 and extension of bottom 22, while menu 212D controls adjustment of headrest 14. As from menu 212A, return to main menu 208 is possible from each of menus 212B–212D.

Secondary menu 212E permits magnetic (or other) storage within the device of preferred adjustments of the passenger to seat 10. Storing a passenger's preferences may be useful in situations where seat 10 must be returned to an upright, unadjusted position temporarily (as, for example, for an intermediate landing and take-off in a multi-segment flight). Return to main menu 208 is also possible from this menu 212E.

Persons skilled in the relevant field will understand that menus 208 and 212A–E may differ from those pictured in FIG. 11 and may include greater or lesser functionality as desired. Other devices alternatively may be used to actuate motors associated with seat 10. Adjustments of seat 10 may in some cases be made manually, moreover, without control by any electronic or other device.

As noted earlier, individual digital control panels consistent with the invention may be linked (for both audio and video) to either or both of the passenger entertainment system and cabin communication system of an aircraft or other vehicle. The panels thus could substitute for dedicated monitors presently mounted within armrests of seats in many aircraft. Having such a device could also permit passengers to communicate with stations or persons outside the vehicle in which seat 10 is placed through connection with, for example, an in-flight or other suitable telephone system.

The foregoing is provided for purposes of illustrating, explaining, and describing embodiments of the present invention. Modifications and adaptations to these embodiments will be apparent to those skilled in the art and may be made without departing from the scope or spirit of the invention. Those so skilled recognize as well that words such as "upright," "horizontal," and "vertical" need not always require exact perpendicularity of any sort relative to a reference location, but rather allow for some non-normality in the relationships described. Finally, incorporated herein by this reference are the entireties of the Bilezikjian, Dixon, et al., and Harris patents discussed in preceding sections of this application.

What is claimed is:

1. A seat for use in a vehicle having a floor, the seat comprising:
    a. a back;
    b. a bottom connected at least indirectly to the back and having an adjustable length, the bottom comprising first and second portions, at least one of the first and second portions having a recess and at least the other of the first and second portions comprising at least one integral shaft insertable into the recess;
    c. at least one bar attached directly or indirectly to the first and second portions;
    d. at least one cam connected to at least one of the first and second portions; and
    e. a frame adapted to be connected to (i) the floor of the vehicle and (ii) at least one of the back or bottom.

2. A seat according to claim 1 in which the first portion is connected at least indirectly to the back and the second portion is adapted to move from one position in which it abuts the first portion to another position in which it does not abut the first portion.

3. A seat according to claim 2 in which the first portion of the bottom is directly connected to the back and each of the first and second portions includes a cushion.

4. A seat defining an internal compartment and comprising:
    a. a bottom; and
    b. a table adapted for storage in a substantially vertically-oriented position in the internal compartment, the table being removable from the compartment for use at a vertical distance above the bottom of the seat, which distance can be adjusted.

5. A seat according to claim 4 in which the table comprises an upper section and a base, the upper section adapted to abut the base for use of the table as a platform.

6. A seat according to claim 5 in which the table further comprises an arm connecting the upper section and the base, the arm being adapted for latching in a position in which the upper section is tilted relative to the base so as to form a non-horizontal support for an object.

7. A seat according to claim 6 in which the table further is adapted to pivot about a vertical axis, permitting it to swing out of the way of an occupant seeking to leave the seat.

8. A seat according to claim 4 further comprising means for adjusting the vertical distance between the table and the bottom of the seat, such adjusting means adapted for control by an occupant of the seat.

9. A seat comprising:
    a. a frame;
    b. a back at least indirectly connected to the frame and whose position relative thereto is adjustable via an electric device; and
    c. interactive electronic display equipment at least indirectly electrically connected to the electric device, the interactive electronic display equipment adapted to receive at least one adjustment command of the occupant of the seat and transfer such adjustment command at least indirectly to the electric device so as to cause adjustment of the position of the back relative to the frame.

10. A seat according to claim 9 in which the interactive electronic display equipment comprises a liquid crystal, touch screen device and the electric device comprises a motor.

11. A seat according to claim 9 for use in a vehicle involved in mass transportation and having entertainment and cabin communication systems and in which the interactive electronic display equipment further is at least indirectly electrically connected to at least one of the entertainment or cabin communication systems.

12. A seat according to claim 11 in which the interactive electronic display equipment is at least indirectly electrically connected to both of the entertainment and cabin communication systems.

13. A seat according to claim 9 for use in a commercial aircraft having an on-board telephone service capable of making connections outside the aircraft and in which the interactive electronic display equipment is at least indirectly electrically connected to the telephone service.

14. A seat according to claim 9 in which the interactive electronic display equipment further is adapted to store at least one preference of the occupant of the seat respecting the adjusted position of the back relative to the frame.

15. A seat comprising:
   a. a back pivotable so as to recline about a fixed pivot point;
   b. a tiltable bottom connected to the back and having an elongated channel defined therein;
   c. a frame to which at least one of the back or bottom is connected; and
   d. a roller fixed to the frame and received within the elongated channel.

16. A seat comprising:
   a. a back;
   b. a bottom having an adjustable length, the bottom comprising first and second portions, the first portion being connected at least indirectly to the back and the second portion adapted to move from one position in which it abuts the first portion to another position in which it does not abut the first portion;
   c. a frame to which at least one of the back or bottom is connected;
   d. an interior compartment;
   e. a table adapted for storage in the internal compartment, the table being removable from the compartment (i) for use as a platform at a vertical distance above the bottom of the seat, which distance can be adjusted, (ii) tilted away from horizontal for use as a non-horizontal support, and (iii) pivoted about a vertical axis so as to swing out of the way of an occupant seeking to leave the seat;
   f. an electric device for adjusting the position of the back relative to the frame; and
   g. an interactive electronic display at least indirectly electrically connected to the electric device, the interactive electronic display adapted to receive at least one adjustment command of the occupant of the seat and transfer such adjustment command at least indirectly to the electric device so as to cause adjustment of the position of the back relative to the frame.

17. A seat according to claim 1 in which the at least one cam is connected to one of the first and second portions such that pulling outward on the other of the first and second portions imparts rotation to the cam, thereby allowing movement of the at least one bar.

18. A seat according to claim 1 in which the first portion is extendable away from the second portion a maximum distance X, further comprising means, comprising a clutch, for extending the first portion away from the second portion an intermediate distance Y, where Y is greater than zero but less than X.

* * * * *